Feb. 14, 1933.　　J. DELATTRE-SEGUY　　1,897,593
PROCESS FOR TREATING OIL
Filed April 4, 1927　　2 Sheets-Sheet 1
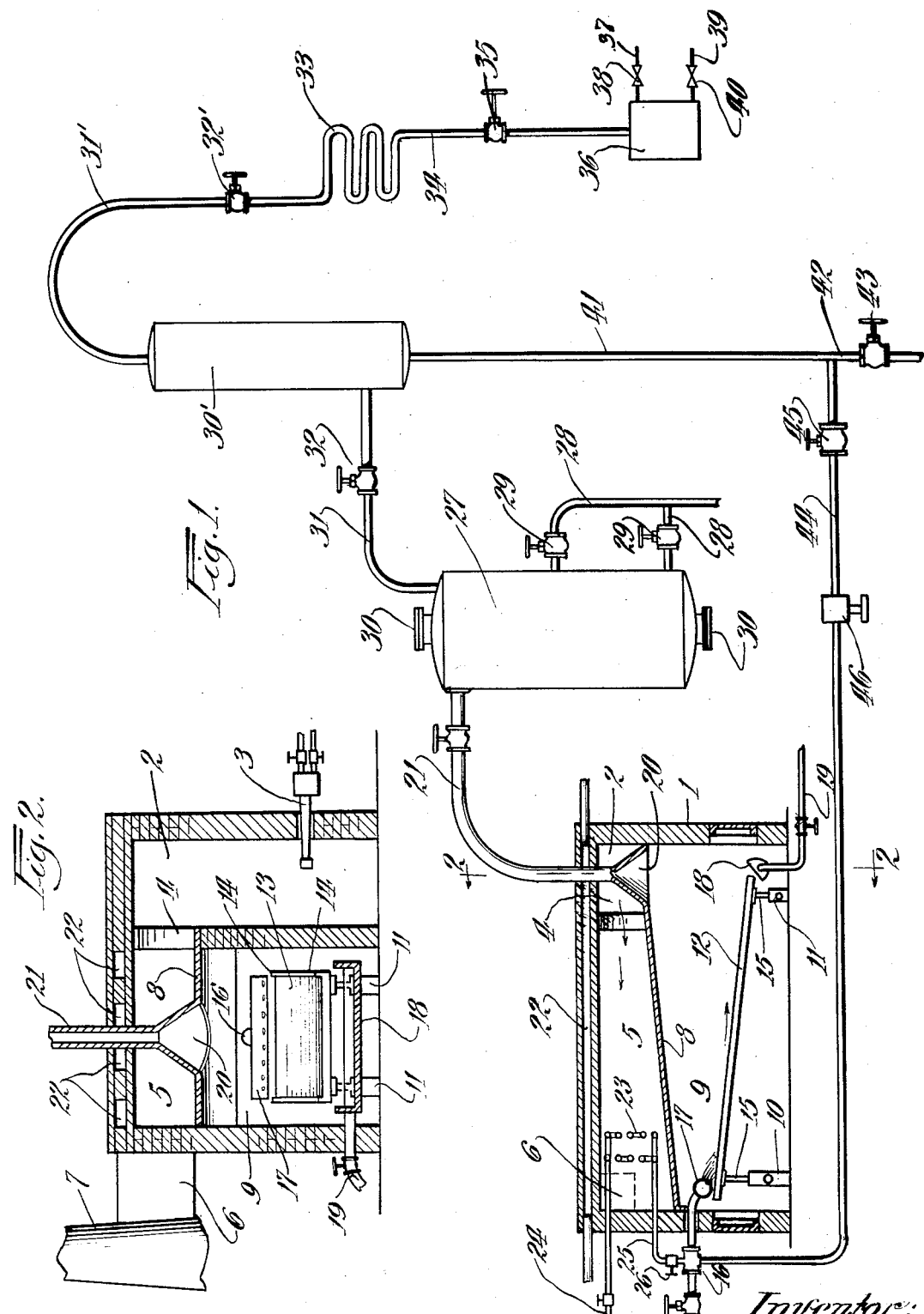

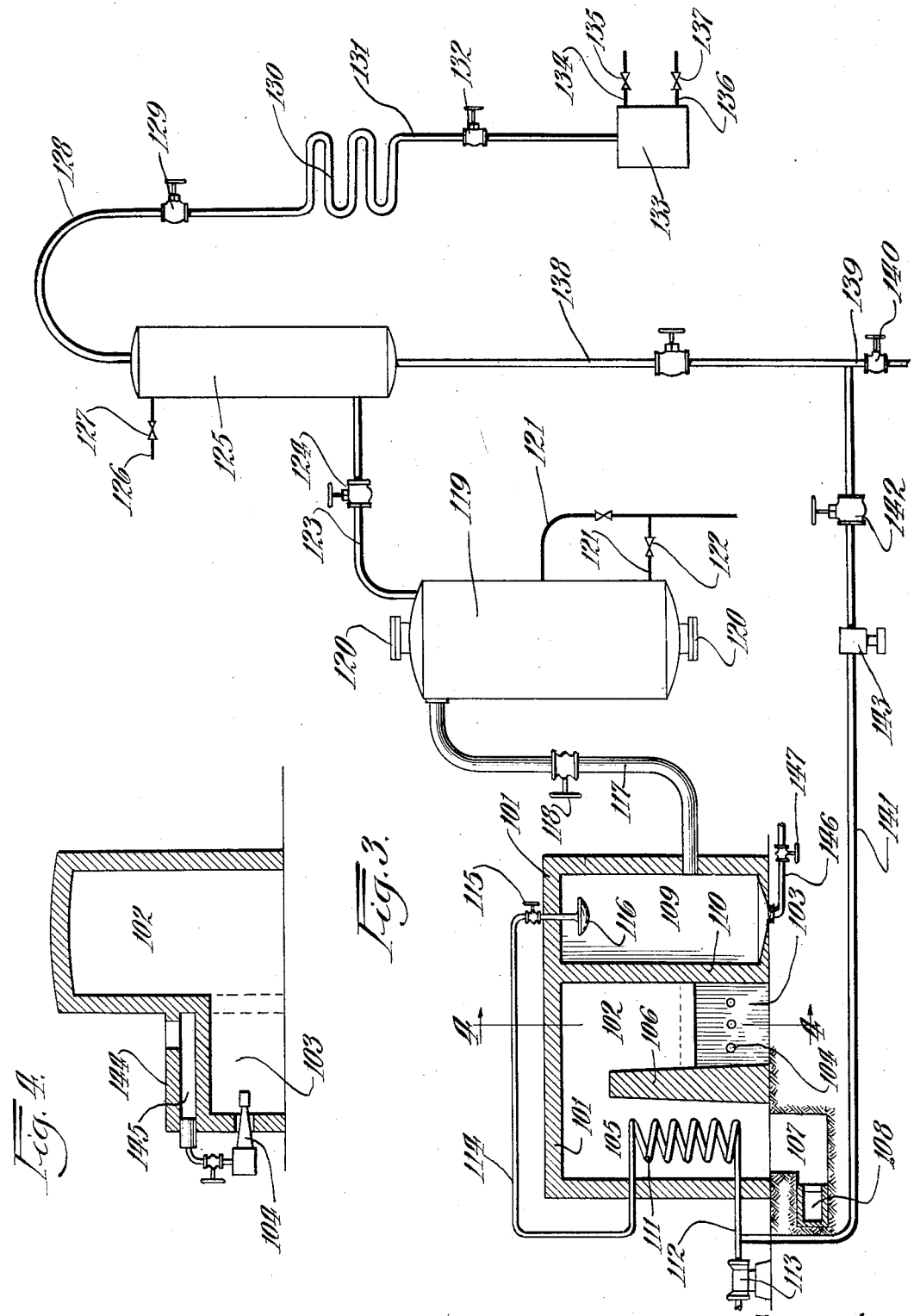

Patented Feb. 14, 1933

1,897,593

UNITED STATES PATENT OFFICE

JEAN DELATTRE-SEGUY, OF CHICAGO, ILLINOIS, ASSIGNOR TO UNIVERSAL OIL PRODUCTS COMPANY, OF CHICAGO, ILLINOIS, A CORPORATION OF SOUTH DAKOTA

PROCESS FOR TREATING OIL

Application filed April 4, 1927. Serial No. 180,690.

This invention relates to improvements in process for treating oil, and refers more particularly to those types of processes in which the oil is distilled or converted by the heat of radiation applied to the oil while the latter is allowed to vaporize, distill and be converted in a suitable zone.

This application is in part a continuation of my applications No. 118,980, now U. S. Patent 1,782,809, filed June 2t8h, 1926, and No. 118,982, now U. S. Patent 1,782,811, filed June 28th, 1926. In these two applications I disclosed the idea of utilizing radiating heat to effect the distillation, vaporization and conversion of oil under superatmospheric or atmospheric pressure while the oil is injected into a zone separated from the source of combustion gas heat by a radiating partition. In said applications, I applied the principle involved therein to the distillation, vaporization and conversion of the oil as it passes through the vaporization zone in the form of a sloping and relatively thin film.

In another feature described in the earlier applications heretofore referred to, a part of the heat of the combustion gases was used to preheat the air of combustion or other materials with the further purpose of thereby protecting the brickwork of the furnace.

The present invention relates to improvements in the process, the principle of which was explained in the two applications heretofore mentioned and features of this invention will be more apparent from the attached drawings and the following description.

It has heretofore been proposed to effect the distillation or conversion of oil in chambers and stills and particularly at atmospheric pressure or relatively low superatmospheric pressure by passing combustion gases in direct contact with the oil to be treated. In some instances, it may be desirable to furnish the heat to the oil without bringing it into direct contact with the combustion gases so as to avoid the necessity of handling the spent combustion gases to effect their separation from the valuable products from distillation or conversion.

One of the features of the present invention resides in heating the oil to effect its distillation and conversion by heat radiated from combustion gases through a radiating partition forming a part of the vaporizing chamber, thus keeping separate, at all times, the source of heat from the oil to be treated.

A further feature of the invention resides in the regulation of the temperature of the source of heat to a degree where the vaporization and conversion of the oil will produce the maximum valuable products without excess formation of non-condensible gases and coke and the combining of this feature of radiant heating of the oil with an increased time element to which the oil is subjected to obtain the maximum degree of vaporization and conversion into valuable products.

It is understood that the process object of the invention may be carried out in a number of ways and with many various apparatus. To illustrate the invention, I describe it hereafter in connection with the use of some forms of apparatus, but it is understood that these are in no way to be taken as limitations for the process object of the invention.

Referring to the drawings, Fig. 1 is a diagrammatic view, partly in section and partly in elevation, of an apparatus to carry out the process.

Fig. 2 is a transverse sectional view taken on line 2—2 of Fig. 1, and showing the combustion chamber.

Fig. 3 is a diagrammatic view, partly in section and partly in elevation, of another apparatus in which the invention may be carried out.

Fig. 4 is a transverse sectional view through line 4—4 of Fig. 3.

Referring to Figs. 1 and 2, 1 designates a furnace setting which may be provided with combustion chamber 2, burner 3, and flue 4 leading to radiating chamber 5 having flue outlet 6 leading to stack 7.

The lower side of the radiating chamber 5 may take the form of a brick wall 8 or it may take the form of a metal plate if such metal will resist the heat of the combustion gases, or it may take the form of a metal plate protected by a layer of radiant brick-like material.

The arrangement is such that the heat from the combustion gases passing through the radiant chamber 5, passes through the wall 8 into the heating chamber 9 below. In the chamber 9 on suitable supports 10 and 11, may be mounted an inclined plate 12, which plate may have a flat base portion 13 and side members 14, the arrangement being such as to form a shallow wide channel for the oil. The ends of the plates are mounted on adjustable jacks 15, the arrangement being such that the slope of the plate 12 may be varied so as to permit regulation of the rate of flow of the oil film thereacross. This will, of course, permit of regulating the time of reaction. The oil is introduced to the upper end of the plate through the pipe 16 by means of a transversely extending perforated nozzle 17. The oil residue is drawn off the plate through the transversely extending funnel 18 provided with drawoff pipe 19 leading to any suitable residue storage. The vapors generated, pass upwardly out of the chamber 9 into the vapor collector 20 and thence to vapor pipe 21.

Inasmuch as the temperature of the radiation chamber 5 is very intense, it may be desirable to cool the upper wall of the chamber by air flues 22, or in any other suitable manner. The air thus preheated, may be used if desired, in the combustion of the fuel.

For the air flue 22 may, if desired, be substituted a coil through which the oil to be treated in chamber 9 may be passed and whereby said oil will be preheated, or, if desired, the air flues 22 can be used and the oil to be injected into chamber 9 for vaporization and conversion, may be preheated by passing, before entering the charging line 16, through a preheating coil 23 which may be positioned near the outlet of the combustion gases from radiant chamber 5 so that the oil is heated by the gases at lower temperatures. Or said preheating coil 23 may be positioned in the flue 6. When the oil is preheated in preheating coil 23 it is introduced thereto through line 24 and discharged therefrom through line 25 controlled by a valve 26 into charging line 16.

It is preferable to so regulate the conditions of operation and the temperatures in the heating and vaporizing zones that the oil receives therein enough heat to vaporize and undergo conversion and it is preferable to regulate the time to which the oil and vapors are subjected to the operating conditions to such a degree that the conversion is only initiated in the chamber 9, the heat of conversion received by the oil therein being utilized to complete the reaction in a separate zone. This will minimize the formation of carbon and noncondensible gases and the formation of coke in the chamber.

To effect this, the vapors pass from the vapor pipe 21 into an enlarged reaction chamber 27 wherein the reaction is completed and where heavier solid and liquid residue may separate. These are drawn off, if it is desired, continuously or intermittently through drawoffs 28 controlled by valves 29. The chamber 27 is also provided with manholes 30 for removal of the solid residues. The vapors from chamber 27 pass through line 31 controlled by valve 32 to dephlegmator 30' wherein they are subjected to fractionating in the usual manner, the non-condensed vapors passing out from the top of the dephlegmator 30' through line 31' controlled by valve 32', thence into condenser 33 and through line 34 controlled by a valve 35 into receiver 36. The receiver is provided with gas release lines 37 controlled by valve 38 and with distillate draw-off 39 controlled by valve 40.

If a portion or all of the apparatus is to be operated under subatmospheric pressure, a vacuum pump may be connected to the gas or distillate drawoffs 37 and 39.

The reflux condensate formed in dephlegmator 30' is withdrawn from the bottom thereof through line 41 where it can be withdrawn from the process through line 42 controlled by valve 43 or returned for further treatment to the charging line 16 through line 44 in which is interposed valve 45 and pump 46.

If carbon deposits upon the plate 12 during the operation, the said carbon may be scraped off from time to time by suitable means (not shown).

To carry out the invention under superatmospheric pressure it may be desirable to vary the form of the apparatus to withstand the pressure. For instance, the heating chamber 9 may take the form of an elongated shell, the upper part of which forms the radiating wall 8, which may be protected by suitable radiant material from excessive heat from the combustion gases; this modified form is described fully in earlier application 118,982, now U. S. Patent 1,782,811, filed June 28th, 1926, of which this application is in part a continuation.

In Figs. 3 and 4 is shown another modified form of apparatus to carry out the invention. Referring to these drawings 101 designates a furnace setting which may be of brick and which is divided into three portions; a combustion chamber 102 provided with an oven 103 heated by burners 104; a heating chamber 105 which is separated from the hottest portion of the heating chamber 102 through refractory wall 106, which is open near its top so that the combustion gases from the oven 103 and the heating chamber 102 can pass through heating chamber 105; the combustion gases after passing through heating chamber 105 pass out through 107 into stack 108.

The third portion of the furnace setting is formed by radiant chamber 109 which is separated from the combustion chamber 102 by a radiating wall 110. The nature of the material of which this wall is made up and the thickness of said material can be varied according to the degree of radiation desired from the combustion chamber 102 to the radiant chamber 109.

In the heating chamber 105 is positioned a heating coil 111 into which oil is fed through line 112 and pump 113. The oil is preheated in heating coil 111 preferably to a temperature short of substantial vaporization or conversion. From the said heating coil 111, the preheated oil passes out through line 114 controlled by a valve 115, discharging through spray nozzle 116 positioned in or near the upper wall of the radiant chamber 109. By this arrangement the oil is sprayed in numerous descending streams through radiant chamber 109 wherein the oil receives the proper amount of radiant heat from the heating chamber 102 through radiant wall 110 to promote vaporization and conversion. The time element is regulated by the size of the chamber and the amount of oil passed thereto, preferably in such a way that the conversion of the oil passed down through the radiant chamber 109 is only started, and this will assist in preventing formation of too high proportions of coke and uncondensible gases.

The vaporized oil passes out from the radiating chamber 109 through vapor line 117 controlled by a valve 118. The vapors enter through line 117 into enlarged reaction chamber 119 provided with manholes 120 and wherein the vapors complete reaction. The liquid residue which may form can be withdrawn therefrom through line 121 controlled by valves 122 and the vapors are withdrawn from reaction chamber 119 through vapor line 123 controlled by valve 124. Said vapors enter into dephlegmator 125 where they undergo fractionating in the usual manner, said fractionating being assisted, for instance, by the introduction of a cooling medium through line 126 controlled by valve 127. The vapors remaining uncondensed after passing through dephlegmator 125 pass out from the top thereof through line 128 controlled by valve 129, thence through condenser 130, through line 131 controlled by valve 132, into receiver 133 which is provided with gas release line 134 controlled by valve 135 and distillate drawoff 136 controlled by valve 137.

The reflux condensate which accumulates in dephlegmator 125 is drawn off therefrom through line 138 from which it can be evacuated through line 139 controlled by valve 140 or from which it can be returned for treatment to the charging line 112 into the heating coil 111 through line 141 in which are interposed valve 142 and pump 143.

To reduce the temperature of the combustion gases passing from the oven 103 to the combustion chamber 102 in the furnace 101, the upper wall 144 of the oven 103 may be provided with flues 145 through which the air to be used for combustion may be passed and preheated. These flues may also be substituted for preheaters through which, for instance, a portion of the raw oil to be treated in the system may be passed in connection with the use of the coil 111. In this manner the temperature of radiation of the gas into chamber 109 through wall 110 may be well regulated.

Other devices may be used to carry out the process herein described which can be well designed by anyone skilled in the art.

One of the important features of the invention is the control of the radiating heat which is utilized for the vaporization and the conversion of the oil and besides the regulation obtained by varying the thickness of the radiating wall, the nature of the material used in said wall and the heat withdrawn from the combustion gases before they pass over said radiating wall by means of the air flues or preheaters shown, it may be desirable to control the temperature of said gases by injecting thereto a cooler gas such as an additional supply of air, preferably heated to some degree, or by returning to the combustion gases in oven 103 or combustion chamber 2, a portion of the spent combustion gases leaving the furnaces through the flues shown at 107 or 6. For this purpose, fans can be used.

Although the treatment of the oil in the chambers 9 and 109 is preferably effected under atmospheric or relatively low superatmospheric pressure below 100 pounds, more or less, the oil can be preheated in heating coil shown at 23 and 111 in Figs. 1 and 3, respectively, under pressure high enough to prevent substantial vaporization of the oil until it reaches the injector 17 or 116 shown in said figures, said pressure being regulated by valves 26 and 115 and the various pumps shown in said figures.

To increase the production of unsaturates and aromatic compounds by this process, a suitable gas or vapor may be combined with the oil before it is injected in the vaporizing chamber. For instance, carbon monoxide or air or oxygen may be used.

It is well understood that crude oil or any fractions thereof may be treated and also any other solid or semi-solid material containing volatile hydrocarbon fractions. For instance, coal, petroleum coke, shale, peat and the like may be treated. The latter materials are preferably reduced to a state of fine division and introduced in the system in the form of paste by being mixed with a small proportion of liquid oil.

In other cases it may be desirable to combine the oil entering the system with steam, the latter being preferably reduced to a state of decomposition into hydrogen and oxygen before being mixed with the oil. Decomposition may be obtained by passing the steam through superheating coils positioned in the furnace 101 in the path of the combustion gases from the oven 103 and the heating of said steam can be utilized in part for regulating the temperature of radiation in chamber 109.

In the event that the oil to be treated contains relatively large proportions of sulphur it may be desirable to mix with the oil before it enters the heating coil 111, a caustic solution or a pulverized caustic material such as lime, soda, potash, barium oxide, etc. In this manner the caustic solution or solid is brought in intimate contact with the oil before it is subjected to conversion and the sulphur compounds contained in the oil are rendered non-corrosive before such sulphur compounds have been subjected to the conversion heat of the oil. This will thus substantially eliminate the sulphur from the oil before corrosion has started and will add to the safety and economy of the process.

It is also to be noted that the features of the invention and the principle thereof can be used for enriching producer gas and water gas and fixing the products by introducing such gas into the radiant chambers of the system, such as 9 in Fig. 1 and 109 in Fig. 3, simultaneously with the injection of oil thereto as previously described.

In the event that the conditions of operation cause unvaporized oil to accumulate in the bottom of chamber 109, this oil can be withdrawn intermittently or continuously through drain 146, provided with valve 147.

I claim as my invention:

A process of cracking hydrocarbon oil which comprises preheating the oil at a temperature below the conversion point, filming said oil over an extended area, heating the resultant film of oil solely by means of radiant heat to a temperature sufficient to only initiate conversion, passing the evolved vapors into an enlarged reaction zone, carrying the conversion reaction to completion in said enlarged zone, removing resultant vapors, and subjecting the same to dephlegmation and condensation.

In testimony whereof I affix my signature.

JEAN DELATTRE-SEGUY.